United States Patent [19]
Yano et al.

[11] Patent Number: 5,824,723
[45] Date of Patent: Oct. 20, 1998

[54] STAIN RESISTANT COVER COMPOSITION FOR COLORED RUBBER PART TIRE AND PROTECTIVE FILM THEREFOR

[75] Inventors: Masashi Yano, Saitama; Yo Uchida, Tokyo, both of Japan

[73] Assignee: Bridgestone Corporation, Tokyo, Japan

[21] Appl. No.: 686,747

[22] Filed: Jul. 26, 1996

[51] Int. Cl.$^6$ .............................. G08K 5/54; C08L 31/04
[52] U.S. Cl. .................... 524/262; 524/265; 524/268; 524/557; 524/563; 524/731; 524/860; 524/863; 524/459
[58] Field of Search ................................ 524/262, 265, 524/268, 731, 860, 863, 563, 557, 459

[56] References Cited

U.S. PATENT DOCUMENTS

| | | | |
|---|---|---|---|
| 4,146,511 | 3/1979 | Moriya et al. | 524/265 |
| 4,332,715 | 6/1982 | Ona et al. | 524/265 |
| 4,362,833 | 12/1982 | Mune et al. | 524/265 |

FOREIGN PATENT DOCUMENTS

| | | |
|---|---|---|
| 6-43682 | 7/1981 | Japan . |
| 4183768 | 6/1992 | Japan . |

*Primary Examiner*—Vasu Jagannathan
*Assistant Examiner*—Olga Asinovsky
*Attorney, Agent, or Firm*—Sughrue, Mion, Zinn, Macpeak & Seas, PLLC

[57] ABSTRACT

The stain resistant cover composition of the present invention for colored rubber part of a tire is characterized by that it comprises water of 100 parts by weight, polyvinyl alcohol of 1.0 to 50 parts by weight, a vinyl acetate resin emulsion of 15 to 150 parts by weight (solid content), a surfactant of 0.5 to 5.0 parts by weight, and a silicon oil of 0.5 to 5.0 parts by weight. The stain resistant protective film of the present invention for colored rubber part of a tire is used as a stain resistant protective film for a colored portion in the side wall part of a tire, wherein the above protective film comprises polyvinyl alcohol, a vinyl acetate resin emulsion, a surfactant, and a silicon oil. The present invention can provide a stain resistant cover composition for colored rubber part of a tire used for preventing the colored part (side wall) of a tire from being stained by antioxidants bleeding from other tires, or dust and being scratched by contact with tires when rubber tires are transported or stored as they are piled up, and a protective film therefor.

7 Claims, 1 Drawing Sheet

STAIN RESISTANT COVER COMPOSITION FOR COLORED RUBBER PART TIRE AND PROTECTIVE FILM THEREFOR

BACKGROUND OF THE INVENTION (1) Field of the Invention

The present invention relates to a stain resistant cover composition (hereinafter called merely "cover composition") for colored rubber part of a tire used for preventing a colored part (side wall) of a tire from being stained by antioxidants bleeding from other tires, or dust and being scratched by contact with tires when rubber tires are transported or stored as they are piled up and to a protective film therefor.

(2) Description of the Related Art

There has so far been the problem that tires for automobiles (so-called white letter tire or white line tire) provided with white rubber in a circular form on a side wall part for decoration or a white rubber part showing thereon a manufacturer name are scratched by contact with other tires or stained in a colored (white) rubber part by antioxidants bleeding from adjacent tires, dust, rubbish and the like and discolored when the tires are transported or stored as they are piled up.

Known as conventional techniques for preventing a colored rubber part from being partially lost or discolored by the scratches and stain described above are:

(1) a method in which a tire is wrapped with a synthetic paper;
(2) a method in which a soft plastic film is adhered to a tire (refer to, for example, Japanese Patent Publication No. Sho 64-3682);
(3) a method in which a tire is wrapped with an LDPE film coated with PVA as an adhesive;
(4) a method in which a tire is wrapped with a film obtained by applying a pressure sensitive adhesive prepared by blending natural rubber or SBR with other elastomers and a hydrogenated petroleum resin on a polyvinyl chloride series resin film (Japanese Patent Application Laid-Open No. Hei 4-183768); and
(5) a method in which a film coated with blue paint is formed on a tire and removed by washing with water in using.

However, in the preceding method (1) in which a tire is wrapped with a synthetic paper, the synthetic paper is expensive and has to be removed when the tire is built in a rim in automobile manufacturers. Further, a problem is involved in the disposition of the removed synthetic paper, such as wasting it as a rubbish.

The preceding method (2) in which a soft plastic film is adhered to a tire is a method effective enough to solve the problem in the preceding wrapping method with a synthetic paper. However, the adhesive tape itself does not have a sufficiently high strength, and an additional step in which the white letter part of a tire is subjected in advance to thin film treatment is needed.

The above wrapping method (3) with an LDPE film has a problem in the strength and the weatherability of LDPE.

The method (4) in which a tire is wrapped with a polyvinyl chloride series resin film coated thereon with a pressure sensitive adhesive has the problem that the film is liable to peeling off in moving such as transporting. Further, in peeling off, the adhesive remains in some cases, and there is the problem that rinsing with a solvent and washing with water have to be repeated in order when the adhesive remains.

The method (5) has the problems that it takes a long time for drying and the thickness of a coated film is not fixed.

Overall investigation of the processability and the cost in the conventional methods (1) to (5) described above shows that the method (5) in which a film coated with blue paint is formed on a tire is effective. As described above, however, the method (5) has the problems that it takes a long time for drying and the thickness of a coated film is not fixed and that if the thin film is tried to form so that the film can be dried in a short time, a coating solution is repelled.

SUMMARY OF THE INVENTION

An object of the present invention is to provide a stain resistant cover composition for colored rubber part of a tire, and a protective film thereof, which can be achieved substantially by a method obtained by improving the preceding method in which a film coated with blue paint is formed on a tire, wherein the composition has a good processability and is dried for a short time after applying; the thickness of the coated film thereof is regularized; the film is provided with such durability that it does not peel off in transporting or handling the tires; and it does not damage the fine view and can easily be removed by washing.

Intensive investigations made by the present inventors regarding the components incorporated into the cover composition have resulted in successfully obtaining a stain resistant cover composition for colored rubber part of a tire and a protective film therefor which meet the object described above, by employing a novel composition comprising water, a specific vinyl acetate resin, polyvinyl alcohol, a surfactant, and a silicon oil, which has a good processability and is dried for a short time after applying as well as providing a coated film with a fixed thickness and which has a durability and can easily be removed by washing. Thus, the present invention has come to be completed.

That is, the stain resistant cover composition of the present invention for colored rubber part of a tire and the protective film therefor comprise the constituents shown in the following items (1) to (6):

(1) a stain resistant cover composition for colored rubber part of a tire comprising water, a vinyl acetate resin emulsion, polyvinyl alcohol, a surfactant, and a silicon oil;

(2) a stain resistant cover composition for colored rubber part of a tire comprising water of 100 parts by weight, a vinyl acetate resin emulsion of 15 to 150 parts by weight (solid content), polyvinyl alcohol of 1.0 to 50 parts by weight, a surfactant of 0.5 to 5.0 parts by weight, and a silicon oil of 0.5 to 5.0 parts by weight;

(3) the stain resistant cover composition for colored rubber part of a tire as described in the above item (1) or (2), further comprising a colorant and/or a softener;

(4) a stain resistant protective film for colored rubber part of a tire used as a stain resistant protective film for a colored portion in the side wall part of a tire, wherein the above protective film comprises a vinyl acetate resin emulsion, polyvinyl alcohol, a surfactant, and a silicon oil;

(5) the stain resistant protective film for colored rubber part of a tire as described in the above item (4), further comprising a colorant and/or a softener; and (6) the stain resistant protective film for colored rubber part of a tire as described in the above item (4) or (5), wherein the protective film has a thickness of 0.01 mm or more.

DETAILED DESCRIPTION OF PREFERRED EMBODIMENTS

Figure 1:
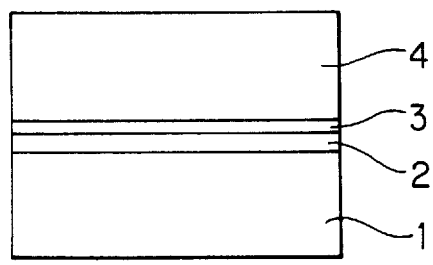
FIG. 1 is a drawing for explaining a method for evaluating stain resistant performances in the examples, wherein the numerals show the following: 1: tire (white letter tire), 2: colored portion in a side wall part, 3: protective film formed with the cover composition, and 4: side wall part (black rubber) on an opposite side.

The stain resistant cover composition of the present invention for colored rubber part of a tire is a novel composition comprising city water (preferably purified water), a vinyl acetate resin emulsion, polyvinyl alcohol, a surfactant, and a silicon oil. The stain resistant protective film of the present invention for colored rubber part of a tire is formed by applying the cover composition described above on a colored portion in the side wall part of a tire and then drying, wherein the above protective film comprises a vinyl acetate resin emulsion, polyvinyl alcohol, a surfactant, and a silicon oil.

The vinyl acetate resin emulsion used in the cover composition of the present invention is incorporated in order to provide a durability (stain resistant performance) and an excellent washing performance, and various emulsions can be used as long as they are vinyl acetate resin emulsions.

The vinyl acetate resin emulsions having a viscosity of 10,000 to 500,000 cp (25° C.) are preferably used, and the aqueous (concentration: 30%) vinyl acetate resin emulsions having the physical property described above are more preferably used in view of the handling performance.

The amount of the vinyl acetate resin emulsion is 15 to 150 parts by weight (solid matter content), preferably 30 to 90 parts by weight per 100 parts by weight of water. If the vinyl acetate resin emulsion having a concentration of 30% is used, the amount is 50 to 500 parts by weight, preferably 100 to 300 parts by weight per 100 weight parts of water.

The amount of the vinyl acetate resin emulsion of less than 15 parts by weight (solid matter content) does not satisfy the stain resistant performance, and the amount exceeding 150 parts by weight (solid matter content) provides an insufficient elongation of the coated film and may cause film breaking due to distortion caused during transportation. Accordingly, both are not preferred.

Polyvinyl alcohol used in the cover composition of the present invention functions as a protective colloid for the vinyl acetate resin emulsion described above.

The amount of polyvinyl alcohol is 1.0 to 50 parts by weight, preferably 5 to 10 parts by weight per 100 parts by weight of water. The amount of polyvinyl alcohol falling in a range of 1.0 to 50 parts by weight as described above causes a stable protective layer to be formed on the vinyl acetate resin emulsion particles and can help prepare the stable and even composition, and therefore makes it possible to coat the fine particles by spraying.

The amount of polyvinyl alcohol of less than 1.0 part by weight leads to the formation of a protective colloid layer which is instable to the vinyl acetate resin emulsion and makes spray coating difficult. Meanwhile, the amount exceeding 50 parts by weight notably increases the viscosity of the composition solution and causes drying to take time. Accordingly, both are not preferred.

The surfactant used in the cover composition of the present invention acts as a dispersant and is incorporated in order to improve the dispersibility of the vinyl acetate resin emulsion.

There can be used as the surfactant, for example, anionic surfactants, cationic surfactants, nonionic surfactants, amphoteric surfactants, and fluorine series surfactants. Among them, the anionic surfactants are preferred.

There can be used as the anionic surfactant, for example, carboxylates such as N-acylamino acid salts and alkyl ethercarboxylates, sulfonates such as alkylsulfonates and alkylbenzene- and akylnaphthalenesulfonates, sulfuric acid ester salts such as alkylsulfates and alkyl ethersulfates, and phosphoric acid ester salts such as alkylphosphates and alkyl etherphosphates.

The amount of the surfactant is 0.5 to 5.0 parts by weight, preferably 0.7 to 1.5 part by weight per 100 parts by weight of water. The amount of the surfactant falling in a range of 0.5 to 5.0 parts by weight as described above secures the uniform dispersibility (dispersant function) of the composition in water and turns a lipophilic property on a tire surface into a hydrophilic property (polarity change function), which improves the coating and adhesion and reduces the surface tension to prevent a cissing of the coating solution from being generated and enhance the coating performance (coating function), whereby these three functions can be exhibited while keeping a good balance.

The amount of the surfactant of less than 0.5 part by weight causes cissing on the coated face of a tire, and the amount exceeding 5.0 parts by weight can not control defoaming and makes it impossible to coat evenly the fine particles. Accordingly, both are not preferred.

The silicon oil used in the cover composition is incorporated in order to regularize the film thickness and impart lubricity.

Various silicon oils can be used and include, for example, polyether-modified silicon oils obtained by turning a part of dimethylsiloxane into a hydrophobic group and a part of polyether into a hydrophilic group, and polyoxyethylene alkylsiloxane. The preferred polyoxyethylene alkylsiloxane includes polyoxyethylene alkylsiloxane in which an alkyl group has 1 to 20 carbon atoms, preferably 1 to 4 carbon atoms.

The amount of the silicon oil is 0.5 to 5.0 parts by weight, preferably 1.0 to 2.0 parts by weight per 100 parts by weight of water. The amount of the silicon oil falling in a range of 0.5 to 5.0 parts by weight as described above sufficiently improves leveling and defoaming and does not cause bleeding on the surface of the coated and dried film.

The amount of the silicon oil of less than 0.5 part by weight is insufficient for leveling and causes insufficient defoaming. Meanwhile, the amount exceeding 5 parts by weight causes the silicon oil to bleed on the surface of the coated and dried film. Accordingly, both are not preferred.

The cover composition of the present invention can further contain a colorant in order to enhance the fine view and provide a masking function and/or a softener in order to improve the physical properties of the protective film.

Various dyes, inorganic pigments, and organic pigments can be used as the colorant, and sulfonated dyes, pigments containing less heavy metals, for example, pigments for cosmetics and emulsions of pigments, and metal oxides. They may be used alone or in combination of two or more kinds thereof.

The amount of the colorant is 0 to 20 parts by weight per 100 parts by weight of water. When the amount of the colorant is 0 part by weight, the transparent cover composition and protective film are obtained. The amount is preferably 0.5 to 2.0 parts by weight. The amount of the colorant falling in a range of 0.5 to 2.0 parts by weight can provide the fine color tone. As the amount of the colorant is increased, the color tone becomes somber, and the fine view is damaged.

The amount of the colorant exceeding 20 parts by weight makes it impossible to disperse the colorant and therefore is not preferred.

There can be used as the softener, for example, dimethyl phthalate (DMP), dibutyl phthalate (DBP), butylbenzyl phthalate (BBP), and among them, dibutyl phthalate (DBP) is preferred. They can be incorporated alone or in combination of two or more kinds thereof.

Dibutyl phthalate (DBP) is effective for film cracking particularly at low temperatures (0° C. or lower).

The amount of the softener is 0 to 50 parts by weight, preferably 5 to 30 parts by weight per 100 parts by weight of water. The amount of the softener falling in a range of 5 to 30 parts by weight can reduce the viscosity of the coating solution while preventing the run of the coated film.

The amount of the softener exceeding 50 parts by weight increases notably the run of the coated film and causes the deformation of the coated film to go on. In addition, it degrades the film strength and increases the rubbing wear of the film. Accordingly, it is not preferred.

Further, glycerin can be incorporated into the cover composition of the present invention for the purpose of further improving the film strength. The amount of glycerin is 0 to 50 parts by weight, preferably 5 to 20 parts by weight per 100 parts by weight of water. The amount of glycerin falling in a range of 5 to 20 parts by weight improves the balance (toughness of the film) of the film hardness with the film elongation.

The amount of glycerin exceeding 50 parts by weight causes the film cracking and therefore is not preferred.

In the present invention, in addition to water, the vinyl acetate resin emulsion, polyvinyl alcohol, the surfactant, the silicon oil, the colorant and/or the softener, a hydrophilic polymer dispersion such as a latex and an additive such as a hydrophilic colloid dispersion of a resin can suitably be incorporated according to necessity.

The cover composition of the present invention is prepared by blending and stirring the additives incorporated according to necessity as well as water, the vinyl acetate resin emulsion, polyvinyl alcohol, the surfactant, the silicon oil, the colorant and/or the softener by means of a stirrer equipped with blades for a agitator, propeller blades, turbine blades, or puddle blades.

The stain resistant protective film of the present invention for colored rubber part of a tire can be formed as a strong protective film by applying the cover composition comprising the respective components described above to a colored part (white rubber) in the side wall portion of a tire by hand or by means of a spray nozzle and then drying (by evaporating water contained).

This protective film has a thickness of 0.01 mm or more, preferably 0.03 to 0.06 mm. The thickness of the protective film of less than 0.01 mm provides an insufficient stain resistance and therefore is not preferred.

In the present invention, the protective film formed on a colored part in the side wall portion of a tire comprises polyvinyl alcohol, the vinyl acetate resin emulsion, the surfactant, and the silicon oil (further containing the colorant and/or softener described above).

This protective film has the fixed thickness of the coated film. Further, the film is provided with such durability that the film does not peel off even in transporting or handling the tires. In addition, the film does not damage the fine view and has such an excellent washing property as capable of being easily removed by washing (this matter shall be explained in detail in the examples described later).

The present invention provides the stain resistant cover composition for colored rubber part of a tire, and the protective film therefor, wherein the composition has a good processability and is dried for a short time after applying; the thickness of the coated film thereof is regularized; the composition is provided with such durability that it does not peel off in transporting or handling the tires; and it does not damage the fine view and can easily be removed by washing with water.

EXAMPLES

The present invention shall more concretely be explained below with reference to examples, but the present invention shall no longer be restricted by these examples.

Examples 1 to 7 and Comparative Examples 1 to 11

The cover compositions having the blend compositions shown in the following Table 1 and Table 2 were prepared by blending the respective components with a puddle blade stirrer.

Evaluated by the following evaluating methods were the stain resistant performances, washing performances, rubbing resistant performances, peeling resistant performances, anti-film cracking performances, uniform coating performances, drying performances, and fine view-maintaining performances of the cover compositions obtained in Examples 1 to 7 and Comparative Examples 1 to 11.

The results thereof are shown in the following Table 1.

(1) Stain resistant performance:

As shown in FIG. 1, a protective film was formed on colored rubber (white rubber) of a tire of 10×20 mm by applying the cover composition with a spray and then drying it. A side wall portion (black rubber) having the same size as that described above was superposed on the above protective film and left for standing at 60° C. for one month. Then, after removing the above protective film by washing, a stain degree on the surface of the colored rubber part (white rubber) was evaluated by visual inspection according to the following evaluation criteria.

The numerals shown in FIG. 1 exhibits the following: 1: tire (white letter tire), 2: colored part in a side wall portion, 3: protective film formed with the cover composition, and 4: side wall part (black rubber) on an opposite side.

Evaluation criteria:

◎: maintaining the same whiteness as that observed before applying,

O: slightly blackened (stained pale brown),

Δ: stained black.

(2) Washing performance:

A protective film was formed on the colored rubber (white rubber) of a tire of 10×20 mm by applying the cover composition with a spray and left for standing at 60° C. for one month. Then, after washing the protective film with a brush such as a scrubbing brush, the washing performance was evaluated by visual inspection according to the following criteria.

Evaluation criteria:

◎: no residual film; the film is easily dissolved in water, and no color remains, O: film partially remains, and residual color is found, Δ: residual film and color observed in the greater part.

(3) Rubbing resistant performance:

The same film as that used for evaluating the washing-away performance (2) described above was formed and left for standing in the same manners as those described above. Then, after rubbing the film surface with a tire, the rubbing resistant performance was evaluated by visual inspection according to the following criteria.

Evaluation criteria:

◎: small wear loss of the film,

O: large wear loss of the film observed in part,

Δ: large wear loss of the film observed in the whole part.

(4) Peeling resistant performance:

The same film as that used for evaluating the washing performance (2) described above was formed and left for standing in the same manners as those described above. Then, after rubbing the film surface with a tire, the peeling resistant performance was evaluated by visual inspection according to the following criteria.

Evaluation criteria:

◎: no film peeling observed,

O: film peeling observed in part,

Δ: film peeling observed in the whole part.

(5) Anti-film cracking performance:

The same film as that used for evaluating the washing-away performance (2) described above was formed in the same manner as that described above and left for standing at high temperatures of 60° C. for a month, and then the anti-film cracking performance was evaluated by visual inspection according to the following criteria.

Evaluation criteria:

◎: no film cracking observed,

O: film cracking observed in part,

Δ: film cracking observed in the whole part.

(6) Uniform coating performance:

The same film as that used for evaluating the washing performance (2) described above was formed in the same manner as that described above, wherein the coating condition after applying was evaluated by visual inspection according to the following criteria.

Evaluation criteria:

◎: capable of uniformly coating thin film,

O: cissing observed in part and slightly heavy coating needed,

Δ: cissing observed in large part and heavy coating needed.

(7) Drying performance:

The same film as that used for evaluating the washing performance (2) described above was formed at room temperatures (25° C.), wherein the time spent for forming the film was evaluated according to the following criteria.

Evaluation criteria:

◎: dried within 30 minutes; excellent drying performance,

O: dried within 60 minutes,

Δ: dried in 60 minutes or more; poor drying performance.

(8) Fine view-maintaining performance:

The same film as that used for evaluating the washing performance (2) described above was formed in the same manner as that described above was formed and left for standing at high temperatures of 60° C. for a month, and then the fine view-maintaining performance was evaluated as a change in the color tone by visual inspection according to the following criteria.

Evaluation criteria:

◎: no change in color tone,

O: partial change in color tone (slightly somber),

Δ: change in color tone observed in the whole part (heavily somber and darkened).

The results thereof are shown in the following Table 1 and Table 2.

TABLE 1

| | Comparative Example | | | Example | | | | | | |
|---|---|---|---|---|---|---|---|---|---|---|
| | 1 | 2 | 3 | 1 | 2 | 3 | 4 | 5 | 6 | 7 |
| Composition (parts by weight) | | | | | | | | | | |
| Water | 100 | 100 | 100 | 100 | 100 | 100 | 100 | 100 | 100 | 100 |
| PVA | 0 | 0 | 60 | 1 | 5 | 10 | 20 | 50 | 5 | 5 |
| Vinyl acetate*1 | 10 | 30 | 600 | 50 | 100 | 200 | 300 | 500 | 100 | 100 |
| Surfactant*2 | 0 | 0.3 | 6.0 | 0.5 | 1.0 | 1.5 | 3.0 | 5.0 | 1.0 | 1.0 |
| Softener*3 | 0 | 0 | 60 | 0 | 10 | 20 | 30 | 50 | 10 | 10 |
| Glycerin | 0 | 10 | 10 | 0 | 5 | 7 | 10 | 20 | 5 | 5 |
| Silicon oil*4 | 0.1 | 0.5 | 10 | 0.5 | 1.0 | 2.0 | 3.0 | 5.0 | 1.0 | 1.0 |
| Colorant*5 | 0.1 | 0.1 | 0.1 | 0 | 0.5 | 0.9 | 2.0 | 2.0 | 10 | 20 |
| Film thickness (mm) | 0.03 | 0.03 | 0.03 | 0.03 | 0.03 | 0.03 | 0.03 | 0.04 | 0.03 | 0.03 |
| Evaluation | | | | | | | | | | |
| Stain resistant performance | Δ | Δ | ◎ | ◎ | ◎ | ◎ | ◎ | ◎ | ◎ | ◎ |
| Washing performance | O | ◎ | O | ◎ | ◎ | ◎ | ◎ | ◎ | ◎ | ◎ |
| Rubbing resistant performance | Δ | O | O | O | ◎ | ◎ | ◎ | O | ◎ | ◎ |
| Peeling resistant performance | ◎ | ◎ | ◎ | ◎ | ◎ | ◎ | ◎ | ◎ | ◎ | ◎ |
| Anti-cracking performance | ◎ | ◎ | ◎ | ◎ | ◎ | ◎ | ◎ | ◎ | ◎ | ◎ |
| Uniform coating performance | Δ | Δ | Δ | O | ◎ | ◎ | O | O | ◎ | ◎ |
| Drying performance | ◎ | ◎ | Δ | ◎ | ◎ | O | O | O | ◎ | ◎ |
| Fine view-maintaining performance | ◎ | ◎ | ◎ | ◎ | ◎ | ◎ | ◎ | ◎ | O | O |

*1: Vinyl acetate resin emulsion having a concentration of 30% and viscosity of 100,000 cp (25° C.).
*2: Anionic.
*3: DBP.
*4: Silicon oil having a molecular weight of 5000 [polyoxyethylenealkyl-(carbon number: 1 to 4)siloxane.
*5: Sulfonated dye.

TABLE 2

| | Comparative Example | | | | | | | |
|---|---|---|---|---|---|---|---|---|
| | 4 | 5 | 6 | 7 | 8 | 9 | 10 | 11 |
| Composition (parts by weight) | | | | | | | | |
| Water | 100 | 100 | 100 | 100 | 100 | 100 | 100 | 100 |
| PVA | 0.5 | 60 | 5 | 5 | 5 | 5 | 5 | 5 |
| Vinyl acetate*1 | 100 | 100 | 30 | 600 | 100 | 100 | 100 | 100 |
| Surfactant*2 | 1.0 | 1.0 | 1.0 | 1.0 | 0.3 | 6.0 | 1.0 | 1.0 |
| Softener*3 | 10 | 10 | 10 | 10 | 10 | 10 | 10 | 10 |
| Glycerin | 5 | 5 | 5 | 5 | 5 | 5 | 5 | 5 |
| Silicon oil*4 | 1.0 | 1.0 | 1.0 | 1.0 | 1.0 | 1.0 | 0.1 | 10 |
| Colorant*5 | 0.5 | 0.5 | 0.5 | 0.5 | 0.5 | 0.5 | 0.5 | 0.5 |
| Film thickness (mm) | 0.03 | 0.03 | 0.03 | 0.03 | 0.03 | 0.03 | 0.03 | 0.03 |
| Evaluation | | | | | | | | |
| Stain resistant performance | ◎ | ◎ | Δ | ◎ | ◎ | ◎ | ◎ | ◎ |
| Washing performance | ◎ | Δ | ◎ | ◎ | ◎ | ◎ | ◎ | ◎ |
| Rubbing resistant performance | ○ | ◎ | Δ | ◎ | ◎ | ◎ | ◎ | ◎ |
| Peeling resistant performance | Δ | Δ | ◎ | ◎ | ◎ | ◎ | Δ | ◎ |
| Anti-cracking performance | ○ | Δ | ◎ | Δ | Δ | ◎ | ◎ | ◎ |
| Uniform coating performance | Δ | Δ | ◎ | Δ | Δ | Δ | Δ | Δ |
| Drying performance | ◎ | Δ | ○ | ○ | ◎ | ◎ | ◎ | ◎ |
| Fine view-maintaining performance | ◎ | ◎ | ◎ | ◎ | ◎ | ◎ | ◎ | ◎ |

*1: Vinyl acetate resin emulsion having a concentration of 30% and viscosity of 100,000 cp (25° C.).
*2: Anionic.
*3: DBP.
*4: Silicon oil having a molecular weight of 5000 [polyoxyethylenealkyl-(carbon number: 1 to 4)siloxane.
*5: Sulfonated dye.

Considerations on the results summarized in Tables 1 and 2:

In summary, it has been found that in Examples 1 to 5 falling in the range of the present invention, satisfied are all performances which are required to the stain resistant protective film, that is, a stain resistant performance, a washing performance, a rubbing resistant performance, a peeling resistant performance, an anti-film cracking performance, a uniform coating performance, a drying performance, and a fine view-maintaining performance, as compared with Comparative Examples 1 to 11 falling outside the range of the present invention.

Individually observing Comparative Examples 1 to 11, Comparative Example 1 is an example in which PVA (polyvinyl alcohol), the surfactant and others are not contained, and it has been found that Comparative Example 1 is inferior in a stain resistant performance, a rubbing resistant performance, and a uniform coating performance.

Comparative Example 2 is an example in which PVA (polyvinyl alcohol) and the like are not contained, and it has been found that Comparative Example 2 is inferior in a stain resistant performance and a uniform coating performance.

Comparative Example 3 is an example in which the vinyl acetate resin emulsion, the surfactant and the silicon oil each have larger contents than the ranges of the present invention, and it has been found that Comparative Example 3 is inferior in a uniform coating performance and a drying performance.

Comparative Examples 4 to 11 are examples in which PVA, the vinyl acetate resin emulsion, the surfactant and the silicon oil each have contents falling outside the ranges of the present invention. That is, Comparative Examples 4 and 5 are examples in which only the contents of PVA fall outside the range of the present invention; Comparative Examples 6 and 7 are examples in which only the contents of the vinyl acetate resin emulsion fall outside the range of the present invention; Comparative Examples 8 and 9 are examples in which only the contents of the surfactant fall outside the range of the present invention; and Comparative Examples 10 and 11 are examples in which only the contents of the silicon oil fall outside the range of the present invention.

Considerations in comparison of Examples 1 to 5 falling in the range of the present invention with Comparative Examples 1 to 11 falling outside the range of the present invention show that the cover compositions satisfying all performances of a stain resistant performance, a washing performance, a rubbing resistant performance, a peeling resistant performance, an anti-film cracking performance, a uniform coating performance, a drying performance, and a

What is claimed is:

1. A stain resistant cover composition for colored rubber part of a tire comprising water of 100 parts by weight, a vinyl acetate resin emulsion of 15 to 150 parts by weight on a solids content basis, polyvinyl alcohol of 1.0 to 50 parts by weight, a surfactant of 0.5 to 5.0 parts by weight, and a silicone of 0.5 to 5.0 parts by weight.

2. The stain resistant cover composition for colored rubber part of a tire as described in claim 1, further comprising a colorant and/or a softener.

3. A stain resistant protective film for a colored rubber part of a tire used as a stain resistant protective film for a colored portion in the side wall part of a tire, wherein said protective film comprises a vinyl acetate resin emulsion, polyvinyl alcohol, a surfactant, and a silicone oil.

4. The stain resistant protective film for a colored rubber part of a tire as described in claim 3, further comprising a colorant and/or a softener.

5. The stain resistant protective film for a colored rubber part of a tire as described in claim 3, wherein the protective film has a thickness of 0.01 mm or more.

6. The stain resistant cover composition for colored rubber part of a tire as described in claim 1, further comprising a colorant and/or a softener.

7. The stain resistant protective film for colored rubber part of a tire as described in claim 4, wherein the protective film has a thickness of 0.01 mm or more.

* * * * *

UNITED STATES PATENT AND TRADEMARK OFFICE
CERTIFICATE OF CORRECTION

PATENT NO. : 5,824,723
DATED : October 20, 1998
INVENTOR(S) : Masashi Yano et al.

It is certified that error appears in the above-identified patent and that said Letters Patent is hereby corrected as shown below:

Title page,
Line 6, delete "silicon" and insert -- silicone --;
Line 12 delete "silicon" and insert -- silicone --;

Column 2,
Lines 31, 43, 50, and 59, delete "silicon" and insert -- silicone --;

Column 3,
Lines 15 and 21, delete "silicon" and insert -- silicone --;

Column 4,
Lines 30, 33, 34, 41, 43, 47, and 50, delete "silicon" and insert -- silicone --;

Column 5,
Lines 38, 46, and 64, delete "silicon" and insert -- silicone --;

Column 9,
Line 31, delete "5" and insert -- 7 --;
Lines 51 and 57, delete "silicon" and insert -- silicone --;

Column 10,
Line 30, delete "5" and insert -- 7 --;
Line 37, following "and a" insert -- fine view-maintaining performance. --.

Signed and Sealed this

Eighteenth Day of September, 2001

*Attest:*

*Attesting Officer*

NICHOLAS P. GODICI
*Acting Director of the United States Patent and Trademark Office*